3,720,762
SPILANTHOL-CONTAINING COMPOSITIONS FOR ORAL USE
Shigeyoshi Hatasa, Chiba-shi, and Isao Iioka, Tokyo, Japan, assignors to Lion Hamigaki Kabushiki Kaisha, Tokyo-to, Japan
Filed July 7, 1971, Ser. No. 160,382
Claims priority, application Japan, July 11, 1970, 45/60,740; July 14, 1970, 45/61,543
Int. Cl. A61r 7/16
U.S. Cl. 424—58    7 Claims

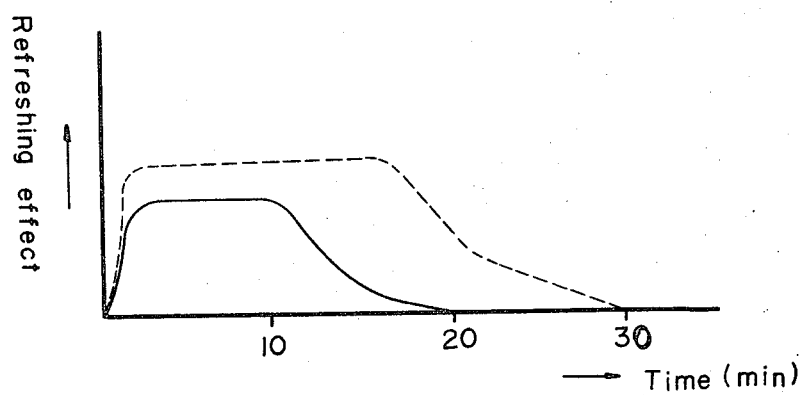

ABSTRACT OF THE DISCLOSURE

In composition intended for oral use, such as dentifrices, mouthwashes and chewing gum, a cooling effect is obtained by incorporating therein spilanthol, or the essential oil obtained from *Spilanthes oleracea* Jacquin or *Spilanthes acmella* var. *oleracea*. These materials have a mild anesthetic effect, and provide a pleasant flavor which is strong and lasts for a substantial time. They may usefully be combined with conventional materials such as methanol or peppermint oil which also provide a cooling effect.

BACKGROUND OF THE INVENTION

In general, conventional compositions intended for use in the mouth may contain various types of flavors and medication ingredients blended therein; however, where a cooling sensation is desired, conventional coolants incorporated for the purpose are relatively weak in effect and the flavor persists only for a short time. The most frequently used cooling flavor, menthol, must be used in relatively large amounts to provide a strongly cooling sensation; this inevitably causes the preparation to have a bitter taste, this being the nature of menthol. Accordingly the menthol content must be limited; in addition, the flavor ends to deteriorate.

SUMMARY OF THE INVENTION

The present invention comprises compositions containing at least one of the materials, spilanthol or the isomers thereof formed in the plants of *Spilanthes oleracea* Jacquin or *Spilanthes acmella* var. *oleracea* or the crude fractions obtained from the said *Spilanthes oleracea* Jacquin or *Spilanthes acmella* var. *oleracea* by extraction or distillation. The spilanthol materials may be combined with each other or with conventional flavoring materials having a cooling effect as composite flavors to be used in dentifrices, mouthwashes, foods, chewing gum, breath fresheners, cough drops, cigarettes and the like.

Accordingly, an object of the present invention is to provide compositions for oral use which afford a strong and lasting cooling sensation.

Another purpose of the present invention is to provide a slight sharp flavor which promotes salivation and stimulates the appetite.

A further object of the invention is to effect analgesic activity due to local anesthetic property, thus making tooth brushing more comfortable in the case of suffering from toothache.

Still another object is to provide a suitable flavor for breath fresheners, mentholated cigarettes, cough drops, foods and the like.

Still other objects and advantages of the invention will in part be obvious and will in part be apparent from the specification.

The invention accordingly comprises a composition of matter possessing the characteristics, properties, and the relation of constituents which will be exemplified in the composition hereinafter described, and the scope of the invention will be indicated in the claims.

BRIEF DESCRIPTION OF THE DRAWING

The single figure shows the relative strengths of a composition in accordance with the present invention and a conventional composition, as a function of time.

DESCRIPTION OF THE PREFERRED EMBODIMENTS

Spilanthol exists as one of the constituents contained in plants such as *Spilanthes oleracea* Jacquin or *Spilanthes acmella* var. *oleracea*. It has a somewhat sharp taste and is a weak anesthetic. The essential oil obtained from the said plants can be employed in place of the pure product. Spilanthol can be obtained from the above plants for example, by extracting with ether the whole dry grass, the flower head being particularly rich in spilanthol. The ether is evaporated off and the oleoresin residue is subjected to steam distillation in order to remove the volatile matter. The residue is reextracted with 60% alcohol to remove the insoluble impurities. It is then extracted again with ether after removal of alcohol, the ether is removed and the remainder is saponified with 10% alcoholic potassium hydroxide, in order to decompose the oil and fat contaminants. The alcoholic solution is diluted with a large amount of water and finally extracted with ether to obtain spilanthol.

The amount of spilanthol or the essential oil containing spilanthol to be employed in dentifrices in accordance with the present invention ranges from 0.01 to 5.00% (weight percent), preferably 0.1–1.0%, based on test results. Spilanthol in one of the forms listed above may also be employed in combination with other flavors. In the cose of combination with menthol or peppermint oil, though the proportion of spilanthol can be varied in a relatively broad range depending on the type of the blend, it is reasonably employed in approximately 1–10% with respect to the gross weight percentage of the blend flavor, a proportion of spilanthol: menthol at 1:4–0, being considered effective. Other flavors such as anethol, carvone, methyl salicylate (oil of wintergreen) can also be blended with spilanthol.

The isomers of spilanthol, or one or more crude constituents obtained from *Spilanthes oleracea* Jacquin, or *Spilanthes acmella* var. *oleracea* may further be employed in the form of a blend of flavors.

Dentifrice compositions according to the present invention can be prepared in the form of dental cream, tooth cake or tooth powder. The abrasive contained in the dentifrice composition may be any of the types conventionally used, for example, included are insoluble sodium metaphosphate, tricalcium phosphate, calcium hydrogen phosphate dihydrate, anhydrous calcium hydrogen phosphate, calcium pyrophosphate, magnesium orthophosphate, trimagnesium phosphate, calcium carbonate, alumina, silica and mixtures thereof.

In addititon, a sweetening agent such as saccharin, essential for the dentifrice composition, other flavors, preservatives such as sodium benzoate, and a coloring agent may also be blended therein.

The figure is a graph showing the results of a test comparing a tooth paste according to the present invention (upper curve) and a conventional dental preparation (lower curve) with respect to the strength and duration of refreshing effect.

A conventional tooth brushing preparation free of spilanthol (comprising tooth brushing base 99.0, menthol 1.0 both in weight percent), and a tooth brushing preparation according to the present invention (comprising tooth brushing base 99.85, spilanthol 0.15, also in weight percent were compared in a panel test. The composition containing spilanthol was found to provide a more potent and longer lasting cooling sensation than the conventional one, as is shown in the figure indicating the results of the cooling sensation persistence test (mean value of the panel test); moreover, the quantity of spilanthol used was much smaller than the quantity of menthol used.

According to the present invention, by blending with the tooth brushing base, spilanthol or the essential oil obtained from *Spilanthes oleracea* Jacquin or *Spilanthes acmella* var. *oleracea* as the flavor, the cooling sensation can be increased markedly compared with a conventional dentifrice. Also, the cooling sensation lasts considerably longer. In addition, the characteristic properties of conventionally employed menthol can also be enhanced, providing a local anesthetic property without astringent taste during tooth brushing, thus allowing comfortable and effective mouth washing and tooth brushing in case of toothache. Consequently, the composition can be employed as a medication by the dentist, since it is satisfactory in view of endowing fresh and soft touch in the mouth devoid of bitter taste; in addition, the slightly sharp taste and promotion of salivation are considered advantageous for improving the appetite.

The result of the panel test for determination of the change of bitter taste sensation after employing the dentifrice is shown below:

FUNCTIONAL TEST ON BITTER TASTE (1) Method

Eating bitter tasting food—Mouth washing—Tooth brushing (with mouth washing)—Eating the same food (comparing the change of taste before and after employing the dentifrice).

(2) Result

| | Persons |
|---|---|
| Panel number | 110 |
| Persons experiencing reduction of the bitter taste | 59 |
| Persons experiencing augmentation of the bitter taste | 29 |
| No change | 22 |

According to Cochran's Q-test, the observed level of significance was 1%.

Preferred embodiments of the present invention are given in the following examples.

Note: The term "spilanthol" in the following examples also includes isomers of spilanthol and mixtures thereof and therewith. The term "crude spilanthol" includes the crude products obtained from *Spilanthes oleracea* Jacquin, *Spilanthes acmella* var. *oleracea* and mixtures thereof. The term "Flavor" used in Examples 5, 6 and 7 refers to the flavor compositions in Examples 8 and 9. All values are in percent by weight. The "Medication ingredient" is a matter of choice on the part of the formulator and need not be present.

Example 1.—Tooth powder

Formulation:
| | |
|---|---|
| Light calcium carbonate | 50.0 |
| Heavy calcium carbonate | 35.0 |
| Sodium lauryl sulfate | 1.0 |
| Saccharin | 0.1 |
| Medication ingredient, q.v. | |
| Spilanthol | 1.0 |
| Water, q.v. | |
| | ad. 100.0 |

Example 2.—Tooth-cake

Formulation:
| | |
|---|---|
| Calcium hydrogen phosphate | 30.0 |
| Insoluble sodium metaphosphate | 35.0 |
| Sodium lauroyl sarcocinate | 1.5 |
| Glycerine | 10.0 |
| Saccharin | 0.15 |
| Medication ingredient, q.v. | |
| Crude spilanthol | 10.0 |
| Water, q.v. | |
| | ad. 100.0 |

Example 3.—Tooth-paste

Formulation:
| | |
|---|---|
| Calcium hydrogen phosphate | 50.0 |
| C.M.C. | 1.0 |
| Sodium lauryl sulfate | 2.0 |
| Glycerine | 25.0 |
| Saccharin | 0.2 |
| Medication ingredient, q.v. | |
| Spilanthol | 0.1 |
| Water, q.v. | |
| | ad. 100.0 |

Example 4.—Tooth-paste

Formulation:
| | |
|---|---|
| Calcium hydrogen phosphate | 20.0 |
| Insoluble sodium metaphosphate | 30.0 |
| Liquid sorbitol | 35.0 |
| Irish moss | 1.3 |
| Saccharin | 0.1 |
| Medication ingredient, q.v. | |
| Water, q.v. | |
| Spilanthol isomer | 0.05 |
| | ad. 100.0 |

Example 5.—Tooth-paste

Formulation:
| | |
|---|---|
| Calcium carbonate | 45.0 |
| Liquid sorbitol | 30.0 |
| C.M.C. | 1.2 |
| Sodium lauroyl sarcocinate | 1.2 |
| Saccharin | 0.15 |
| Crude spilanthol by extraction | 5 |
| Flavor | 0.7 |
| Medication ingredient, q.v. | |
| Water, q.v. | |
| | ad. 100.0 |

Example 6.—Tooth-wash

Formulation:
| | |
|---|---|
| Polyoxyethylene sorbitan monolaurate | 1.5 |
| Chlorophyll, q.v. | |
| Saccharin | 0.04 |
| Flavor | 3.0 |
| Spilanthol | 0.05 |
| Denatured alcohol (with geraniol), q.v. | |
| Water | 27.0 |
| | ad. 100.00 |

Example 7.—Mouth-wash

Formulation:

| | |
|---|---|
| Polyoxyethylene sorbitan monolaurate | 1.2 |
| Polyoxyethylene propylene glycol | 0.7 |
| Glycerine | 10.0 |
| Pigment (Blue No. 1), q.v. | |
| Hibitene hydrochloride, q.v. | |
| Saccharin | 1.0 |
| Flavor | 3.0 |
| Spilanthol | 0.01 |
| Alcohol, q.v. | |
| Water | 28.0 |
| | ad. 100.00 |

Example 8.—Flavor composition

Formulation:

| | |
|---|---|
| Methol | 40 |
| Spilanthol | 10 |
| Anethole | 10 |
| Carvon | 20 |
| Methyl salicylate | 20 |

Example 9.—Flavor composition

Formulation:

| | |
|---|---|
| Methol | 30 |
| Spilanthol | 3 |
| Anethole | 15 |
| Carvon | 20 |
| Methyl salicyclate | 30 |
| Ethanol | 2 |

Examples 1 through 7 show that spilanthol, or its isomer or in crude form can be used to flavor dentifrices whether toothpastes, tooth powder, toothcakes or mouthwashes. These compounds have a pleasant taste, a cooling effect and act as a mild local anesthetic. The flavor compositions of Examples 8 and 9 are suitable for use in dentifrices or in foods, chewing gum, cigarettes, cough, drops and the like.

It will thus be seen that the objects set forth above, among those made apparent from the preceding description, are efficiently attained and, since certain changes may be made in the above product without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A composition for oral use comprising a flavoring component selected from the group of flavoring materials consisting of spilanthol, a crude spilanthol-containing product of the plant *Spilanthes oleracea* Jacquin, a crude spilanthol-containing product of the plant *Spilanthes acmella* var. *oleracea* and mixtures thereof, the content of said flavoring component lying between about 0.01 and 5% of the total weight of said composition, and a dentally-acceptable carrier.

2. A composition as defined in claim 1, wherein said crude flavoring spilanthol-containing product is the ether-soluble fraction of at least one plant selected from the group consisting of *Spilanthes oleracea* Jacquin and *Spilanthes acmella* var. *oleracea*.

3. A composition as defined in claim 1, wherein said crude flavoring spilanthol-containing product is the non-volatile fraction, non-distillable with steam, of the ether-soluble fraction of at least one plant selected from the group consisting of *Spilanthes oleracea* Jacquin and *Spilanthes acmella* var. *oleracea*.

4. A composition as defined in claim 1, further comprises other flavoring materials selected from the group consisting of menthol, peppermint oil, anethole, carvon and oil of wintergreen, the ratio of spilanthol-containing component to said other flavoring material lying between 1:4 and 1:10.

5. A composition as defined in claim 1, wherein said composition is a dentifrice and said flavoring component amounts to 0.01% to 5.00% by weight of said dentifrice.

6. A composition as defined in claim 1, wherein said composition is a dentifrice and said flavoring component amounts to 0.1% to 1% by weight of said dentifrice.

7. A composition as defined in claim 1, wherein said flavoring component and said other flavoring material together comprise from 1 to 10% of the gross weight of said composition.

References Cited

Accepted Dental Therapeutics, 33rd ed., published by the American Dental Association, Chicago, 1968, pp. 91–92.

Chemical Abstracts, vol. 21, entry 3348[1], 1927.

RICHARD L. HUFF, Primary Examiner

U.S. Cl. X.R.

424—48; 99—140; 131—17